(12) United States Patent
Fredlund

(10) Patent No.: US 8,808,780 B2
(45) Date of Patent: Aug. 19, 2014

(54) METHOD AND APPARATUS FOR MAKING A FOOD CHIP PRODUCT

(76) Inventor: Anders Fredlund, Bjärred (SE)

( * ) Notice: Subject to any disclaimer, the term of this patent is extended or adjusted under 35 U.S.C. 154(b) by 0 days.

(21) Appl. No.: 13/812,152

(22) PCT Filed: Jul. 29, 2011

(86) PCT No.: PCT/SE2011/000143
§ 371 (c)(1),
(2), (4) Date: Jan. 25, 2013

(87) PCT Pub. No.: WO2012/015345
PCT Pub. Date: Feb. 2, 2012

(65) Prior Publication Data
US 2013/0122170 A1   May 16, 2013

(30) Foreign Application Priority Data

Jul. 29, 2010   (SE) ...................................... 1000798

(51) Int. Cl.
*A23P 1/10* (2006.01)
(52) U.S. Cl.
USPC ........... 426/517; 426/496; 426/505; 426/523; 426/512; 426/497; 425/335; 425/167; 425/371; 99/390; 99/391; 99/385; 99/427; 99/423; 99/349; 99/404; 99/426; 99/373; 99/352
(58) Field of Classification Search
USPC ................. 426/517, 496, 505, 523, 512, 497; 425/335, 167, 371; 99/390, 391, 385, 99/427, 423, 349, 404, 426, 373, 352
See application file for complete search history.

(56) References Cited

U.S. PATENT DOCUMENTS

| | | | |
|---|---|---|---|
| 2,286,644 A | 6/1942 | Pringle | |
| 2,550,687 A * | 5/1951 | Goss | 264/297.4 |
| 3,015,176 A * | 1/1962 | Freeman | 38/66 |
| 3,431,838 A * | 3/1969 | Hutter | 100/322 |
| 3,739,712 A * | 6/1973 | Duning | 99/349 |
| 3,878,015 A * | 4/1975 | Johnston | 156/222 |
| 4,050,863 A * | 9/1977 | Book | 425/84 |
| 4,504,205 A * | 3/1985 | Stofko | 425/181 |
| 4,792,359 A * | 12/1988 | Barrall et al. | 524/4 |
| 4,800,090 A | 1/1989 | August | |
| 4,919,965 A | 4/1990 | Childers, Jr. | |
| 4,938,126 A * | 7/1990 | Rubio et al. | 99/349 |
| 5,443,891 A * | 8/1995 | Bach | 428/182 |
| 5,458,051 A * | 10/1995 | Alden et al. | 99/349 |
| 5,470,600 A | 11/1995 | Petelle | |

(Continued)

FOREIGN PATENT DOCUMENTS

DE   102002023569 A1   5/2007
EP   0299755 A1   1/1989

(Continued)

*Primary Examiner* — Anthony Weier
(74) *Attorney, Agent, or Firm* — KIPA AB; Tomas Friend

(57) ABSTRACT

An apparatus (1) for making shaped food chip products (2) including hotplates (3) (4) that are arranged in such way that, when in use, food snacks are hold between the hotplates and where at least one hotplate surface is covered with a steam permeable membrane (5). Also a method for making food chip product (2) including feeding slices of food in a mono-layered between hotplates (3, 4) where at least one of the hotplate surfaces pressing on the food snack is covered with a membrane (5) that guidance the steam away.

9 Claims, 2 Drawing Sheets

(56) References Cited

U.S. PATENT DOCUMENTS

| | | | |
|---|---|---|---|
| 5,490,967 A * | 2/1996 | Martin et al. | 264/322 |
| 5,538,676 A * | 7/1996 | Bielfeldt | 264/109 |
| 5,722,315 A * | 3/1998 | Naramura | 99/349 |
| 5,802,959 A | 9/1998 | Benson et al. | |
| 5,848,483 A * | 12/1998 | Honda et al. | 34/662 |
| 6,148,718 A * | 11/2000 | D'Alterio | 99/349 |
| 6,153,244 A * | 11/2000 | Stanger et al. | 426/511 |
| 6,192,789 B1 * | 2/2001 | Agcaoili et al. | 99/349 |
| 6,192,790 B1 * | 2/2001 | Balandier | 99/390 |
| 6,277,425 B1 | 8/2001 | Nash et al. | |
| 6,623,676 B1 * | 9/2003 | Davis et al. | 264/112 |
| 7,393,480 B2 * | 7/2008 | von Haas | 264/40.5 |
| 2005/0118318 A1 | 6/2005 | Mihalos et al. | |
| 2010/0171233 A1 * | 7/2010 | Baxter et al. | 264/123 |
| 2010/0275789 A1 * | 11/2010 | Lee et al. | 99/386 |

FOREIGN PATENT DOCUMENTS

| | | |
|---|---|---|
| EP | 0656177 A1 | 6/1995 |
| EP | 1597977 A1 | 11/2005 |
| EP | 1656834 A2 | 5/2006 |
| GB | 1195137 A | 6/1970 |
| WO | WO 9415481 | 7/1994 |
| WO | WO 2009034132 A2 | 3/2009 |
| WO | WO 2009035406 | 3/2009 |

* cited by examiner

METHOD AND APPARATUS FOR MAKING A FOOD CHIP PRODUCT

FIELD OF INVENTION

The invention relates to a method and apparatus for making a shaped food chip product, comprising heat sources.

BACKGROUND OF THE INVENTION

Snack foods are very popular. There are many methods in preparing shaped chip products such as potato chips and other forms of vegetables and grain chips as corn or tortilla chips. Most of methods making chip snacks rely on deep-frying resulting in snacks with 20-45% fat. Fat is high in calories and heavy intake of calories may lead to overweight, which is not desirable. This has created a need for low-fat and fat free snacks.

Other inventors have attempted to produce low fat chips product that have similar taste and features as deep-fried. A curved or wave shape is a desirable feature for snacks from a visible aspect. Furthermore can an uniformed shaped chip product more easily be packed in tubes. Earlier attempts to make shaped low-fat snacks such as using methods of microwave, infrared or radio waves, extruding, steam, hot air and other baking ovens have not obtained desirable taste or needed considerable economic investments or had high running costs.

Generally, there are two very important factors when it comes to food snacks; taste and price. Therefore there has been an object to produce a shaped fat free chip product, which feels and tastes similar to deep fried chip products in an economical process.

US 2286644 to Pringle et al introduce a method of placing slices of food between open mesh belts and conveying them through deep-frying and then releasing the food snack.

GB1195137 to Liepa et al disclose a method of making uniformly saddle shaped crisp-like edible dough products. The dough is sheeted, cut and then held between two similarly configured moulds during deep-frying until final moister is reached.

U.S. Pat. No. 4,800,090 by August et al disclose a method of preparing fat free slices of food by conveying a monolayered snacks through infrared heaters then microwave energy and then another infrared zone to brown them into crisp.

EP 0299755 by Szwerc et al disclose a method of making fat free curved snack food. A film of starch and flavours is applied on one side of the food slice, causing the slice to curve when heated in an oven, due to less expansion on the treated side.

WO 94/15481 by Sprecher et al disclose process and apparatus for preparing fat free snacks by conveying monolayered snacks through a numerous wave guides with high intensity microwave field until final crisp and moister is reached. The conveyer belt has curved links so when dough is put onto gravity will form it as the link form.

U.S. Pat. No. 4,919,965 Childers et al disclose a process where fat free slices of snacks are toasted between dual opposed heating surfaces. The cooking surfaces have a relieved surface so that moister can be driven off. Approximately one half of said surface comes into contact with the produce slices being cooked.

U.S. Pat. No. 5,470,600 by Patelle et al disclose a process where fat free slices of snacks are continuously conveyed and first are heated with infrared then two stages of forced air and finally dielectric radio frequency oven.

U.S. Pat. No. 5,802,959 by Benson et al discloses apparatus for preparing fat-free snacks. The snacks are conveyed through a stage of infrared heaters from above and burners from underneath, followed by air impingement jets where the snacks are hold in place by a hold down belt from above and finally a hot air zone until desired point.

U.S. Pat. No. 6,277,425 to Nash et al disclose the use of air knifes to cool of extrudate strands before cutting. The product produced can be in the shape of a tube. The extrudate can be fat free.

US 2005118318 to Mihalos et al disclose process and apparatus for forming a wave chip by baking slices of dough and when still warm and soft. The snacks are transported on a conveyer belt into the gap formed between the conveyer and a rotary forming roller. The malleable baked snacks are subjected to a guided curtain of air to cool and set the snacks in a curved or wave configuration.

WO 2009035406 to Fredlund discloses apparatus and process for continuously making fat free food chips by conveying the chips onto a heat source and holding the snacks down with a steam permeable belt. The snacks can be released when still moist and dried by forced air.

SUMMARY OF THE INVENTION

It is an object of the present innovation to fill a long felt need by providing an apparatus and method for making a shaped fat free food chips product with a long shelf life, that looks, feels and tastes good in an economical continuous process without using any cooking oil whatsoever.

This object is achieved by an apparatus according to claim 1 and a method according to claim 7.

According to the present invention an apparatus for making food snacks comprising hotplates that are arranged in such way that, when in use, food snacks are hold between the hotplates and where at least one hotplate surface is covered with a steam permeable membrane. The membrane allows the steam to leave the snack while it's being dried out.

The apparatus is suitable of making snacks from a variety of grain, flours, sugars, vegetables, fruit, root fruits and the like that can be cut or formed into flat, thin slice shaped portions. The methodology is suitable for making potato chips, nachos, cracker biscuits and the like. The present invention is especially adapted for making shaped snacks.

Initially a dough is prepared. In an exemplary embodiment pregelatinized potato flakes are mixed with potato starch, maltodextrin and water to produce cohesive, machinable dough for producing crispy, crunchy texture, chip products.

The dough is then sheeted out to a thickness of 0.4 to 15 mm but more preferable to 0.7 to 1.2 mm and cut into squares, triangles, ovals or any desired form. The method of sheeting and cutting is well known in the art and chosen method is less important and any of the commercial sheeters and cutters at market can be use.

The slices should be mono layered between two hotplates. One hotplate should have a steam permeable membrane on the surface and the other one should be covered with a non-stick food-grade material as Teflon™. The chip product should be hold until a final moister is reached. The surfaces of the hotplates should be parallel even if they can form curve and form the slice into a wave, curve or a horse saddle shape. The gap between the plates can be set for 0.4 to 17 mm but more preferable 1.0-1.4 mm.

The plates can be heated by any of present heating methods, as electrical heating elements, direct fire, IR-heaters, convection heating or other techniques present at the market.

The temperature should be set to 110 to 350 deg C. More preferable is 150 to 220 deg C.

The membrane can be a weaved cloth of metal, Kevlar, coal or glasfibers and mixes hereof that is covered with Teflon™ or another food grade non-stick material. Cloths can be weaved with thickness of 0.025 to 4 mm. Thicker cloths are better to guide the steam in all direction due to open meshes or holes in all direction, but they leave a pattern on the snack which could be undesirable. Thinner steam permeable cloths guide steam mostly through the cloth but not sideways inside the cloth. Due to smaller meshes in thinner cloths they leave less or no pattern on the snack. In an exemplary embodiment of the invention one cloth is used as a membrane. An alternative embodiment of the invention two cloths can be used. A thinner cloth with even surface closes to the snack that can guide the moister away from the snack and than a thicker that can guide the steam away from the hotplate. However thicker cloths can be covered with more non-stick material on the food side and thereby leave less patterns on the chips.

The process time is preferable 5 to 300 seconds but in the exemplary embodiment it is more preferable 10 to 60 seconds. If the desired snack should be fully dried in this stage they should reach a moister of 0-6%.

An alternative embodiment of the invention of the apparatus is to arrange the said membranes on both heating plates.

The novel feature of the present invention will be further explained by the drawings and detailed descriptions. It should be understood that the drawings are for illustration and description only and are not intended to as a definition of the limits of the present illustration.

SHORT DESCRIPTION OF THE FIGURES

The invention is explained in more detail with references to figures.

DESCRIPTION OF EXEMPLARY EMBODIMENTS OF THE INVENTION

Figure 1:
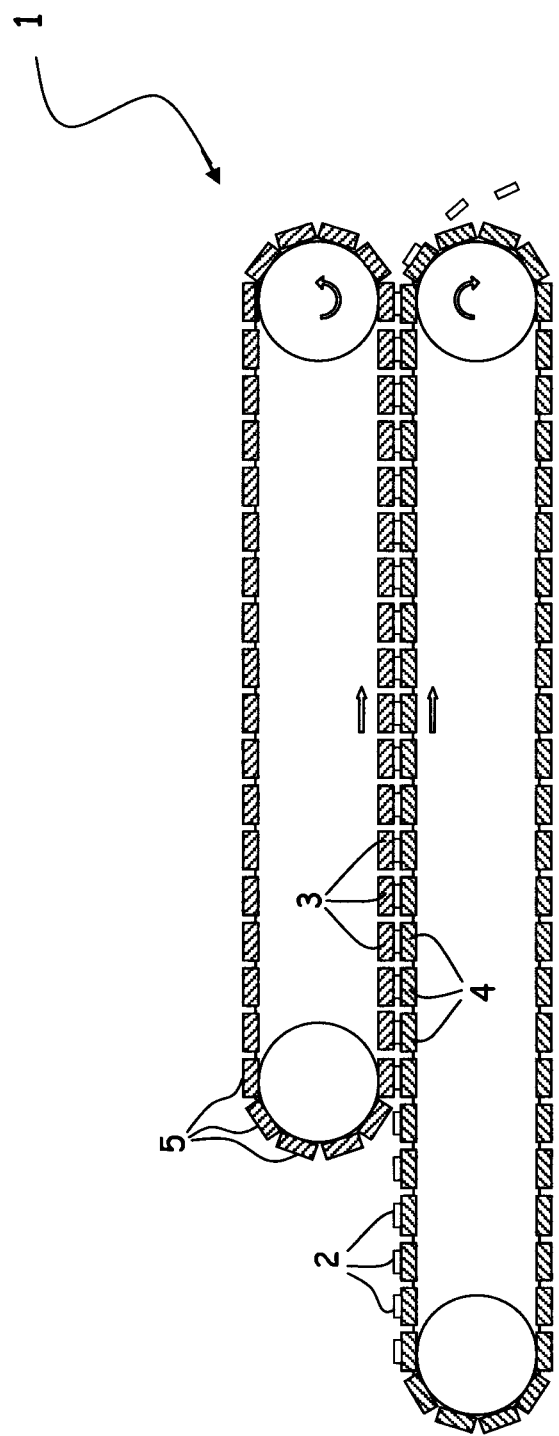
FIG. 1 is a side view of an embodiment of the apparatus according to present invention.
Figure 2:
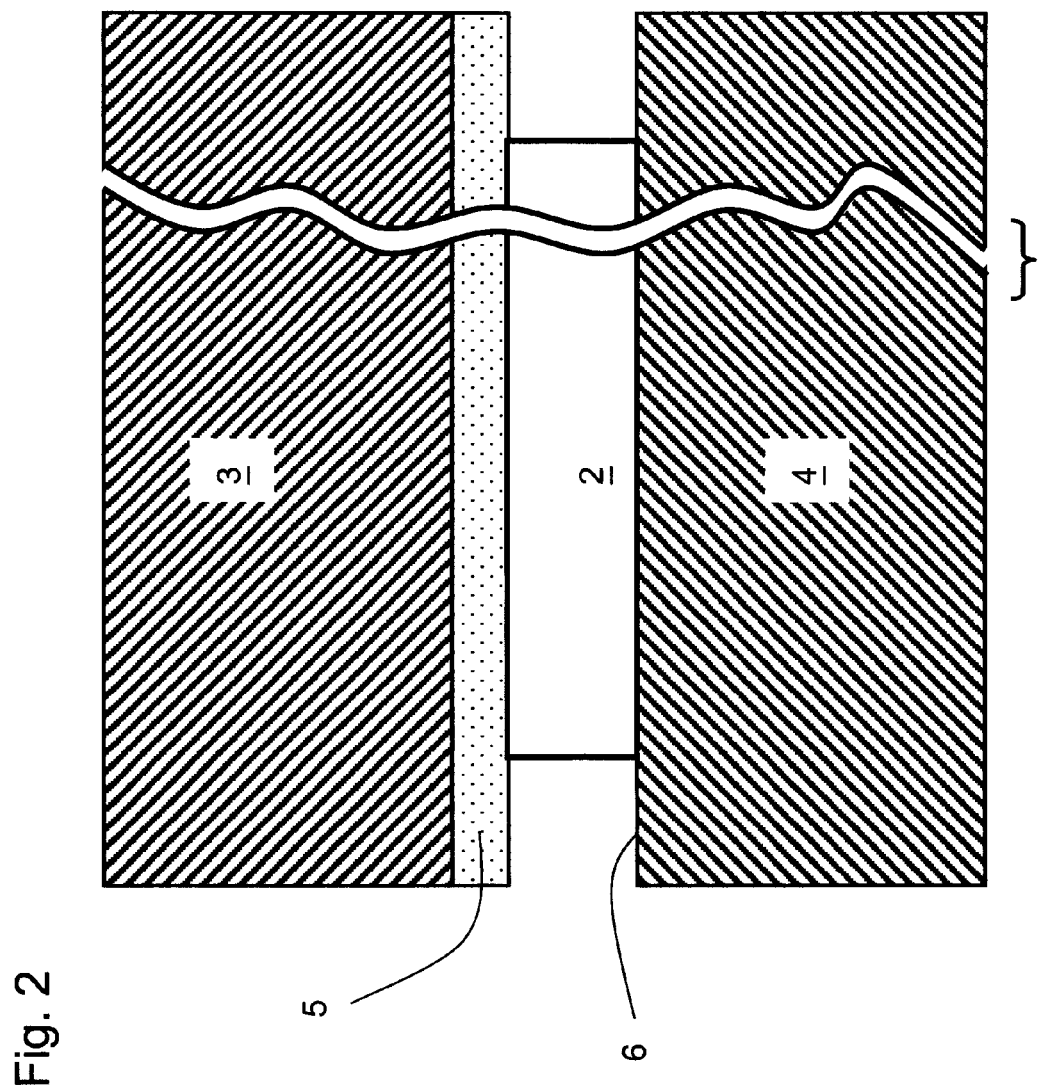
FIG. 2 is a side view of a close up of the heating plates and membranes showed in the FIG. 1 embodiment of the apparatus according to present invention.

FIGS. 1 and 2 disclose an outline of an embodiment of the apparatus (1) according to the present invention. 70% of potato starch is mixed with 27% of potato flakes and 3% maltodextrin and then 30% of the total weight of water is added and mixed in a twin screw extruder. Temperature set to 23 deg C. The dough is pressed through a gap of 2 mm and sheeted down with two pairs of 250 mm rolls to a thickness of 0.8 mm. A conventional gingerbread cake-punching machine punched out ovals of 50 times 70 mm onto the hotplate (4) The hotplate (4) was covered with Teflon™ (6). The upper hotplate (3) lowered and set the gap to letting the snack expand to 1.2 mm. Both the hotplates were set to 200 deg C. The upper hotplate (3) had a membrane on its surface consistent of a 0.20 mm Teflon™ covered steam permeable glasfiber cloth (5) which is formed as a horse saddle. The snacks (2) were dried for 45 sec until reaching a moister level of 3%. The snacks were then fed into a seasoning unit and then 90 fat free chip products were packed into tubes.

The foregoing is a disclose of preferred embodiments of practicing the present invention. However modifications and variations will be obvious to the one skilled in art. For instant ingredients, recipes, temperatures, process times and water levels can be changed. Likewise can preheating and other drying steps be used in combination with present invention.

The invention claimed is:

1. A method for making a food chip product, said method comprising:
    placing a food onto a first food contacting surface of a first hotplate;
    positioning a second food contacting surface of a second hotplate at a gap distance from said first food contacting surface;
    drying the food by heating said food between said first and second food contacting surfaces and thereby allow steam to leave the food; and
    releasing the dried food from the first and second food contacting surfaces
    wherein at least one of the first and second hotplates comprises a steam permeable membrane that guides steam away from the food being heated by said first and second hotplates.

2. The method of claim 1, and further comprising applying pressure on the food by pushing said first and second hotplates together.

3. The method of claim 1, wherein said drying of the food comprises heating said food until a desired moisture of the food is reached.

4. The method of claim 3, wherein said desired moisture is from 0% to 6%.

5. The method of claim 1, wherein said first food contacting surface and/or said second food contacting surface is a food-grade non-stick surface.

6. The method of claim 1, wherein said first food and said second food contacting surfaces are wave, curve, or saddle shaped such that said method produces a wave, curved, or saddle shaped food chip product.

7. The method of claim 1, wherein said drying of the food comprises heating said food between first and second food contacting surfaces having a temperature of from 110 ° C. to 350 ° C. for a time of between 5 second and 300 seconds.

8. The method of claim 1, wherein said gap distance is from 0.4 mm to 17mm.

9. An apparatus for making shaped food chip products, said apparatus comprising pairs of hotplates wherein:
    each pair of hotplates comprises a first hotplate comprising a first food contacting surface and a second hotplate comprising a second food contacting surface;
    said first and second hotplates are movable with respect to one another such that, when in use, said food may be placed on one of said first and second food contacting surfaces and then held between said first and second food contacting surfaces and heated; and
    at least one of said first and second hotplates comprises a steam permeable membrane covering the food contacting surface and configured to allow steam to leave said food when said food is held and heated between said first and second hotplates wherein the steam permeable membrane comprises a fiberglass cloth.

* * * * *